(12) United States Patent
Wickman et al.

(10) Patent No.: US 8,750,854 B2
(45) Date of Patent: Jun. 10, 2014

(54) PARENT-CONTROLLED EPISODIC CONTENT ON A CHILD TELECOMMUNICATION DEVICE

(75) Inventors: Marianna Wickman, Seattle, WA (US); Michael Kemery, Seattle, WA (US); Winston Wang, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 296 days.

(21) Appl. No.: 12/732,103

(22) Filed: Mar. 25, 2010

(65) Prior Publication Data

US 2011/0237236 A1 Sep. 29, 2011

(51) Int. Cl.
 *H04M 3/00* (2006.01)
(52) U.S. Cl.
 USPC .......................................... 455/419; 370/338
(58) Field of Classification Search
 CPC ........... G08C 2201/30; G08C 2201/42; G08C 2201/93
 USPC .......................................... 455/450; 370/338
 See application file for complete search history.

(56) References Cited

U.S. PATENT DOCUMENTS

| | | | |
|---|---|---|---|
| 5,023,907 A | 6/1991 | Johnson et al. | |
| 6,767,212 B2 | 7/2004 | Thomas | |
| 6,889,212 B1 | 5/2005 | Wang et al. | |
| 7,046,139 B2 | 5/2006 | Kuhn et al. | |
| 7,113,981 B2 | 9/2006 | Slate | |
| 7,218,912 B2 | 5/2007 | Erskine et al. | |
| 7,302,272 B2 | 11/2007 | Ackley | |
| 7,415,711 B2 | 8/2008 | Chew et al. | |
| 2001/0018660 A1 | 8/2001 | Sehr | |
| 2002/0156792 A1 | 10/2002 | Gombocz et al. | |
| 2003/0078036 A1 | 4/2003 | Chang et al. | |
| 2004/0166878 A1 | 8/2004 | Erskine et al. | |
| 2004/0180648 A1 | 9/2004 | Hymel et al. | |
| 2004/0235520 A1 | 11/2004 | Cadiz et al. | |
| 2005/0096009 A1 | 5/2005 | Ackley | |
| 2005/0125819 A1 | 6/2005 | Ono et al. | |
| 2005/0278637 A1 | 12/2005 | Youm et al. | |
| 2006/0101499 A1 | 5/2006 | Aravamudan et al. | |
| 2006/0121428 A1 | 6/2006 | Terrazas | |
| 2006/0122938 A1 | 6/2006 | Hicks et al. | |
| 2006/0143047 A1 | 6/2006 | Briegs et al. | |
| 2006/0143622 A1 | 6/2006 | Prabandham et al. | |
| 2006/0189348 A1 | 8/2006 | Montulli et al. | |
| 2006/0194181 A1 | 8/2006 | Rosenberg | |
| 2006/0224943 A1 | 10/2006 | Snyder et al. | |
| 2006/0242242 A1 | 10/2006 | Ezumi et al. | |

(Continued)

FOREIGN PATENT DOCUMENTS

| | | |
|---|---|---|
| KR | 20010096407 | 11/2001 |
| KR | 20020066804 | 8/2002 |
| KR | 20060108093 A | 10/2006 |
| KR | 20070005163 A | 1/2007 |
| KR | 20070017229 A | 2/2007 |
| WO | WO2010008509 A2 | 1/2010 |

OTHER PUBLICATIONS

The PCT Search Report & Written Opinion mailed Oct. 27, 2011 for PCT Application No. PCT/US11/28527, 11 pages.

(Continued)

*Primary Examiner* — Marcos Batista
(74) *Attorney, Agent, or Firm* — Lee & Hayes, PLLC

(57) ABSTRACT

Techniques for remotely establishing sequences of content to be enabled on a child device are described herein.

19 Claims, 8 Drawing Sheets

(56) References Cited

U.S. PATENT DOCUMENTS

| | | | |
|---|---|---|---|
| 2006/0255119 A1 | 11/2006 | Marchasin et al. | |
| 2006/0258341 A1 | 11/2006 | Miller et al. | |
| 2006/0270395 A1 | 11/2006 | Dhawan et al. | |
| 2007/0006327 A1 | 1/2007 | Lal et al. | |
| 2007/0021145 A1 | 1/2007 | Lam | |
| 2007/0037562 A1 | 2/2007 | Smith-Kerker et al. | |
| 2007/0037563 A1 | 2/2007 | Yang et al. | |
| 2007/0039025 A1 | 2/2007 | Kraft et al. | |
| 2007/0058637 A1 | 3/2007 | Lo | |
| 2007/0070404 A1 | 3/2007 | Caradec et al. | |
| 2007/0081075 A1 | 4/2007 | Canova, Jr. et al. | |
| 2007/0099609 A1* | 5/2007 | Cai | 455/428 |
| 2007/0127633 A1 | 6/2007 | Hertel et al. | |
| 2007/0198413 A1 | 8/2007 | Nagao | |
| 2007/0250382 A1 | 10/2007 | Beck | |
| 2008/0064381 A1 | 3/2008 | Ackley | |
| 2008/0070608 A1 | 3/2008 | Ackley | |
| 2008/0070609 A1 | 3/2008 | Ackley | |
| 2008/0096544 A1 | 4/2008 | McNamara et al. | |
| 2008/0096603 A1 | 4/2008 | Sparre | |
| 2008/0140433 A1 | 6/2008 | Levy et al. | |
| 2008/0162305 A1 | 7/2008 | Rousso et al. | |
| 2008/0181201 A1 | 7/2008 | Park et al. | |
| 2008/0209577 A1 | 8/2008 | Vrielink et al. | |
| 2008/0215494 A1 | 9/2008 | Corbett | |
| 2008/0233944 A1* | 9/2008 | Tu | 455/421 |
| 2008/0246605 A1 | 10/2008 | Pfeffer et al. | |
| 2008/0256641 A1 | 10/2008 | Lo | |
| 2008/0288966 A1 | 11/2008 | Maes | |
| 2008/0299527 A1 | 12/2008 | Groot et al. | |
| 2008/0307324 A1 | 12/2008 | Westen et al. | |
| 2009/0005000 A1 | 1/2009 | Baker et al. | |
| 2009/0006116 A1 | 1/2009 | Baker et al. | |
| 2009/0006200 A1 | 1/2009 | Baker et al. | |
| 2009/0015653 A1 | 1/2009 | Baek | |
| 2009/0018963 A1 | 1/2009 | Abu-Amara | |
| 2009/0038005 A1 | 2/2009 | Howarth | |
| 2009/0054092 A1 | 2/2009 | Stonefield et al. | |
| 2009/0069084 A1 | 3/2009 | Reece et al. | |
| 2009/0106110 A1 | 4/2009 | Stannard et al. | |
| 2009/0143007 A1 | 6/2009 | Terlizzi | |
| 2009/0148824 A1* | 6/2009 | Argott | 434/307 R |
| 2009/0149205 A1 | 6/2009 | Heredia et al. | |
| 2009/0199178 A1 | 8/2009 | Keller et al. | |
| 2009/0209240 A1 | 8/2009 | Mahowald | |
| 2009/0225788 A1 | 9/2009 | Kephart et al. | |
| 2009/0254656 A1 | 10/2009 | Vignisson et al. | |
| 2009/0282005 A1 | 11/2009 | Kim et al. | |
| 2009/0317778 A1 | 12/2009 | Oberman | |
| 2010/0039254 A1* | 2/2010 | Cooper et al. | 340/539.11 |
| 2010/0122170 A1 | 5/2010 | Girsch et al. | |
| 2010/0235476 A1 | 9/2010 | Lin et al. | |
| 2010/0241530 A1 | 9/2010 | Murset | |
| 2010/0299712 A1 | 11/2010 | Austin et al. | |
| 2010/0322234 A1 | 12/2010 | Kodaka | |
| 2011/0065419 A1 | 3/2011 | Book et al. | |
| 2011/0202863 A1 | 8/2011 | Corrallo | |
| 2012/0066088 A1 | 3/2012 | Murset | |

OTHER PUBLICATIONS

The PCT Search Report & Written Opinion mailed Oct. 31, 2011 for PCT Application No. PCT/US11/28545, 8 pages.
The PCT Search Report & Written Opinion mailed Nov. 30, 2011 for PCT Application No. PCT/US11/28371, 10 pages.
"AT&T Video Share Lets Wireless Customers Share Live Video", retrieved from <<http://www.att.com/gen/press-room?pid=9199>> on Feb. 26, 2009, 2 pages.
"Back to MediaCast FAQ", retrieved from <<http://vumenow.com/support mediashare.php?faq=1>> on Feb. 26, 2009, 2 pages.
Beck, "An Allowance That's Measured in Minutes, Not Cents," retrieved at <<http://www.nytimes.com/2007/11/25/business/yourmoney/25allowance.html?_r 32 2&pagewanted=print>>, Nov 25, 2007, 3 pgs.
"Cingular to roll out video/chat service", The Seattle Times: Tech Tracks, retrieved from <<http://blog.seattletimes.nwsource.com/techtracks/archives/2006/06/cingular_to_roll_out_videochat_service_1.html>>, Jun. 28, 2006, 2 pages.
GSM Association, "Image Share Interoperability Specification 1.1", Official Document IR.79, Apr. 10, 2008, pages.
GSM Association, "Video Share Interoperability Specification 1.3", Official Document IR.74, Oct. 30, 2008, 18 pages.
"My Reward Board," retrieved at <<http://www.myrewardboard.com/>> on Mar. 24, 2010, available as early as Jan. 25, 2010, 1 pg.
Raffle, et al., "Family Story Play: Reading with Young Children (and Elmo) Over a Distance", CHI 2010, Apr. 10-15, 2010, Atlanta, Georgia, 10 pages.
Yarosh et al., "Developing a Media Space for Remote Synchronous Parent Child Interaction", IDC 2009, Jun. 3-5, 2009, Como, Italy, 10 pages.
Oomble.com, "Frequently Asked Questions", Last Revised Aug. 22, 2007, Retrieved from http//web.archive.org/web/20080122014735/www.oomble.com/public/faq.jsp on Jan. 18, 2011, 12 pages.
PCT International Search Report and Written Opinion mailed Mar. 29, 2011 for PCT Application No. PCT/US10/45991, 10 pgs.
PCT International Search Report and Written Opinion mailed Apr. 15, 2011 for PCT Application No. PCT/US10/45722, 10 pgs.
Final Office Action for U.S. Appl. No. 12/544,464, mailed on Jun. 1, 2011, Michael Kemery, "Licensed Content Purchasing and Delivering".
The PCT Search Report & Written Opinion mailed Jun. 27, 2011 for PCT Application No. PCT/US10/45996.
Office Action for U.S. Appl. No. 12/544,881, mailed on Sep. 6, 2011, Kemery et al., "Parent Telecommunication Device Configuration of Activity-Based Child Telecommunication Device", 15 pages.
Office Action for U.S. Appl. No. 12/544,881, mailed on Apr. 11, 2012, Kemery, "Parent Telecommunication Device Configuration of Activity-Based Child Telecommunication Device", 17 pages.
Non-Final Office Action for U.S. Appl. No. 12/731,717, mailed on Feb. 16, 2012, Winston Wang et al, "Shared Book Reading", 25 pages.
Non-Final Office Action for U.S. Appl. No. 12/544,404, mailed on Apr. 26, 2012, Winston Wang et al, "Shareable Applications on Telecommunications Devices", 10 pages.
Final Office Action for U.S. Appl. No. 12/544,404, mailed on Oct. 19, 2012, Winston Wang et al, "Shareable Applications on Telecommunications Devices", 7 pages.
Final Office Action for U.S. Appl. No. 12/731,717, mailed on Aug. 16, 2012, Winston Wang et al, "Shared Book Reading", 16 pages.
Non-Final Office Action for U.S. Appl. No. 12/731,698, mailed on Aug. 30, 2012, Michael Kemery et al., "Chore and Rewards Tracker", 7 pages.
Final Office Action for U.S. Appl. No. 12/731,698, mailed on Jan. 23, 2013, Michael Kemery et al., "Chore and Rewards Tracker", 8 pages.
Non-Final Office Action for U.S. Appl. No. 12/544,464, mailed on Mar. 27, 2013, Michael Kemery, "Licensed Content Purchasing and Delivering", 11 pages.
Final Office Action for U.S. Appl. No. 12/544,464, mailed on May 23, 2013, Michael Kemery, "Licensed Content Purchasing and Delivering", 12 pages.
Office Action for U.S. Appl. No. 12/544,464, mailed on Nov. 1, 2013, Michael Kemery, "Licensed Content Purchasing and Delivering", 13 pages.
Office action for U.S. Appl. No. 12/731,717, mailed on Sep. 23, 2013, Wang et al., "Shared Book Reading", 17 pages.
Office Action for U.S. Appl. No. 12/544,881, mailed on Sep. 30, 2013, Michael Kemery, "Parent Telecommunication Device Configuration of Activity-Based Child Telecommunication Device", 19 pages.
Final Office Action for U.S. Appl. No. 12/731,717, mailed on Feb. 6, 2014, Winston Wang et al, "Shared Book Reading", 17 pages.

* cited by examiner

PARENT-CONTROLLED EPISODIC CONTENT ON A CHILD TELECOMMUNICATION DEVICE

BACKGROUND

In the last few years, telecommunications devices such as cellular phones, landline phones and IP-based phones have become more and more capable, offering an increasing array of functions. Once limited to simple point-to-point voice communications, telecommunications devices have evolved into so-called "smart phones" that offer many different modes of telecommunication, such as voice, video, text messaging, instant messaging, email, and other modes of communication. Furthermore, modern smart phones have capabilities approaching those of more traditional desktop computers, including the ability to load and run third party applications. Applications are available for business use, as well as for personal use, education, and entertainment.

Many people view their telecommunications devices as critical to daily life: necessary for coordinating both business and personal activities. Among many families, cell phones, in particular, are becoming a primary means of communication, and more and more children have their own mobile devices. This allows parents to keep in touch with their children despite the hectic schedules of both parents and children.

The advanced capabilities of modern communications devices create a variety of educational opportunities, as well as opportunities for rich interactions between parents and children even when they are geographically separated. Unfortunately, these opportunities are accompanied by dangers such as the ability to access inappropriate materials and to communicate with virtually anyone in the world. Parents usually want to limit accessibility in order to protect their children from inappropriate content, activities, and communications.

Some telecommunications devices can indeed be configured to limit their communications capabilities. For example, a phone might be configured to accept telephone calls only from specified parties such as parents. Likewise, the phone might be configured to only allow certain outgoing calls. Access to content and activities can be similarly limited. However, these types of configuration choices are inflexible and mainly exclusionary. They do not allow the parent to participate in creating new experiences and learning opportunities for the child, and do nothing to facilitate or increase close interaction between parent and child.

SUMMARY

This document describes a technology to establish and update permitted content on a child device remotely from a parent device. A user of the parent device configures a sequence of permitted content items, and sends the sequence to the child device. On the child device, the indicated content items are enabled one at a time, in the indicated sequence. Each content item is enabled only when the previous item of the sequence is done.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
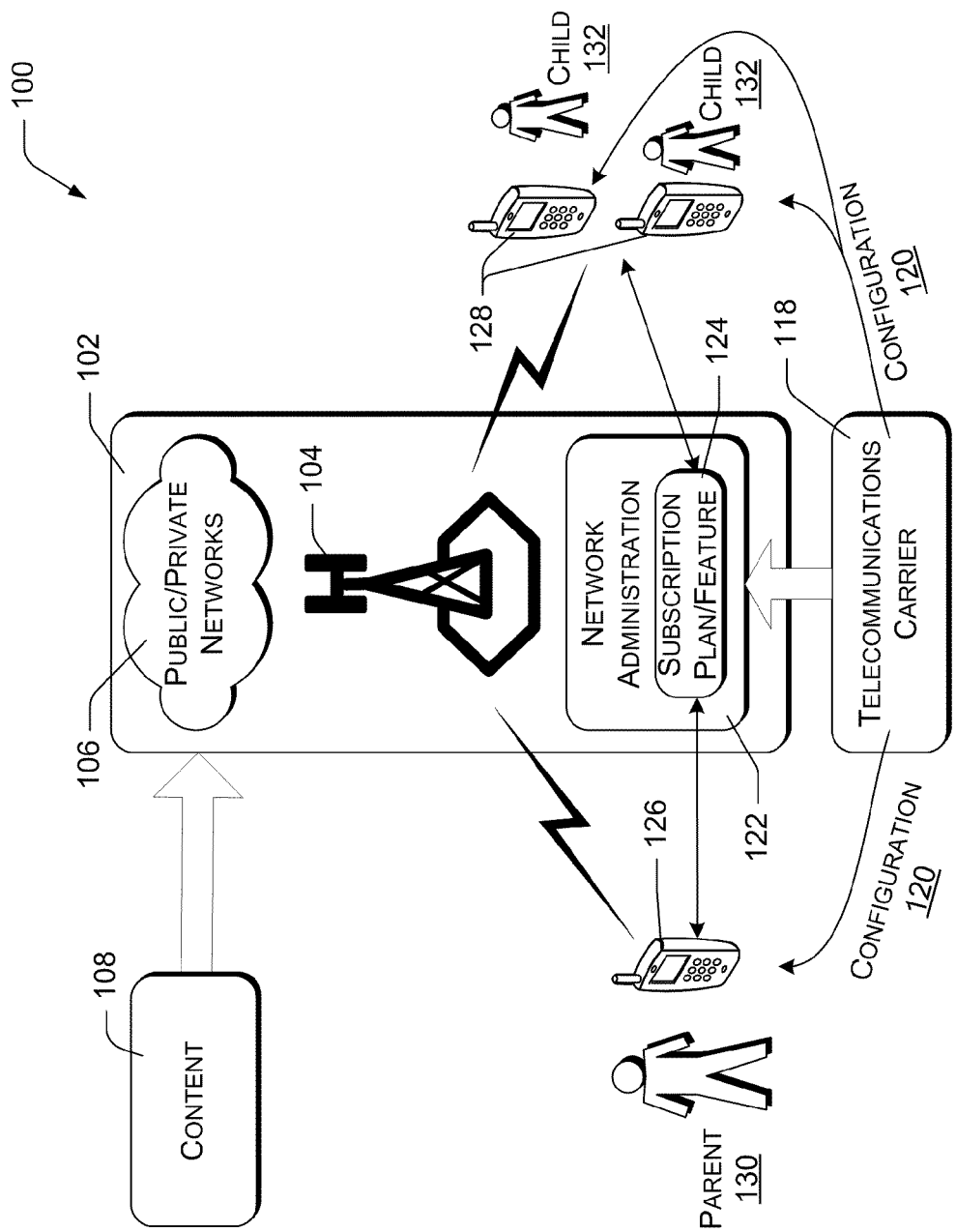
FIG. 1 illustrates an exemplary telecommunications system that facilitates voice and other modes of communication between different telecommunication devices used by different users.

FIG. 1 illustrates an exemplary telecommunications system 100 that facilitates voice and other modes of communication between different telecommunication devices used by different users. In the described example, system 100 is a cellular telecommunications system that is accessed by wireless communications devices such as portable telephone handsets, smart phones, PDA phones, pagers, portable computers, and various other types of portable devices having wireless communications capabilities. Telecommunications system 100 may be any other type of telecommunications system, such as a landline telecommunications system, an IP-based telecommunications system, or a converged telecommunications system (such as an Unlicensed Mobile Access or UMA system).

Telecommunications system 100 includes a telecommunications network 102 which in turn comprises an infrastructure 104 (in this example, a cellular infrastructure) connected for communications with one or more private networks and/or one or more public network(s) (such as the Internet) 106. Infrastructure 104 is represented by a cell tower commonly associated with a cellular telecommunications network, although other types of mobile technologies might also be used.

Originally intended to implement voice communications, cellular networks and other wireless communications systems now support many different types of communications, such as video, instant messaging, email, text messaging (e.g., Short Message Service or SMS messaging), multimedia messaging (e.g., Multimedia Message Service or MMS messaging), etc. Systems such as telecommunications system 100 may also provide access to the Internet. Modern telecommunication devices have advanced capabilities that allow them to utilize the wide range of resources and activities available through the Internet.

Telecommunications network 102 utilizes various technologies and protocols for implementing different modes of communications with and between telecommunications devices. Telecommunications network 102 supports voice communications as well as data communications. Telecommunications devices utilizing telecommunications network 102 can conduct various types of communications with other telecommunications devices supported by telecommunications network 102, as well as with devices and resources connected to private/public network(s) 106.

Numerous carriers maintain large communications networks as examples of telecommunications network 102. T-Mobile, as one example, is a large mobile network operator that maintains a world-wide wireless communications infrastructure. Other operators maintain independent mobile networks, and there is a degree of cooperation and interoperability between networks. At the least, users of one mobile network can call and communicate with users of different fixed, IP-based, mobile and converged networks. In addition, users can communicate with each other through various Internet communication techniques, made possible by the connection of the various mobile networks to the Internet.

By virtue of the connection of telecommunications network 102 to private/public network(s) 106, system 100 encompasses all different resources available to users of such network(s), as well as other resources that might be made available exclusively to users of telecommunications network 102. For purposes of this description, these resources are shown in FIG. 1 as content or content items 108, and include any type of resource capable of being consumed or used with a telecommunications device. Content 108 might include web sites; graphics; photographs; audio and/or video materials such as songs, movies, lectures, live and recorded performances, television shows, and other things; textual matter; documents; books; e-books; interactive books; educational materials; applications; games; training materials; etc. Content 108 encompasses both downloadable and streamable content, as well as static, dynamic, active, and interactive content.

As mentioned, telecommunications network 102 is maintained by a carrier, which is represented in FIG. 1 as telecommunications carrier 118. Users of telecommunications network 102, also referred to as subscribers, purchase devices and telecommunication plans from telecommunications carrier 118 in order to gain access to telecommunications network 102.

Devices used with telecommunications network 102 operate under network subscription plans that define the terms, features, and fees under which network use is granted. For example, a voice subscription plan might allow a predefined number of minutes per month of network voice call usage. A data subscription plan might indicate a predefined quantity of data that can be exchanged per month—such as one gigabyte. Voice and data might be combined into a single plan which allows both voice and data usage.

One or more telecommunications devices are allowed to participate in and utilize the services provided by each subscription plan. Telecommunications carrier 118 typically provisions or configures each telecommunications device for use on the carrier's network. Part of a configuration 120 involves linking the telecommunications device to the plan—this is also referred to as "activating" the device. Some carriers use removable Subscriber Identity Modules (SIM cards) to store subscriber information for a particular subscription plan. The SIM card is tied to a particular user account and can be inserted into a device to enable that device to function under the user's account.

Configuration 120 also includes setting various device parameters for the specific characteristics of the network of telecommunication carrier 118 and the plan under which the telecommunications device will operate. In practice, telecommunications devices are often pre-configured for specific mobile networks.

So-called "family" subscription plans have become popular. A family plan allows multiple devices to share certain features under the umbrella of a single subscription—typically at a significant cost savings. For example, all family devices might share a common pool of voice call minutes. As another example, calls between family devices might not be counted towards monthly allocations of voice call minutes.

Telecommunications network 102 has an administrative component 122 that tracks individual devices, authorizes device access to the network, and limits device usage to the specific features and allocations that are included in the applicable subscription plans. Administrative component 122 keeps track of minutes and data quantities used, provides accounting and billing information, and in some cases provides resources for use by telecommunications devices on telecommunications network 102. Telecommunications carrier 118 interacts with administrative component 122 of telecommunications network 102 to create and configure service plans for individual users and user families.

FIG. 1 illustrates a new type of multi-user subscription plan or feature 124 in which one telecommunications device is designated as a parent device 126, and one or more other telecommunications devices are designated as child device(s) 128. Although the terms "parent device" and "child device" are used herein, a "parent device" is any type of device that can control, either directly or via an alternate interface (such as a desktop or Web interface) the activities available to a user of a "child device", regardless of whether the specific users of the "parent device" and "child device" have a parent-child relationship.

For purposes of discussion, child devices 128 will be referred to in singular or plural, depending on the context, and it should be understood that the principles and techniques described may apply to a single device or to multiple devices. Furthermore, it should be understood that various control features and limitations may be applied separately to different child devices, or might be applied in common to several child devices.

Parent device 126 is a normal or specially configured telecommunications device. In one embodiment, child device 128 may be a specialized smart phone or other device, designed especially for young children. For example, it might have large keys, bright colors, and be ruggedized to withstand the rough treatment it might receive by children. Furthermore, the operating system and user interface of the child device might be customized for young children through simplification and graphical designs that are more appealing and understandable to children.

In one embodiment, child device 128 might be a tablet-like device having dimensions similar to those of an 8½×11 inch sheet of paper. Rather than keys, such a device might have a touch-sensitive display surface to accept user input.

Each child device 128 is specially configured with features that allow a user of a parent device 126 to configure child devices 128 remotely, and to thereby control and enhance the content and activities made accessible via child devices 128. Specifically, a user of parent device 126, such as a parent 130, can specify a sequence of content items or content episodes for consumption by a user of a particular child device 128, such as a child or children 132. The parent can specify the sequence of content items via parent device 126, or via an alternate interface on a desktop computer, for example. Child device 128, upon receiving a communication indicating such a content sequence, can begin making the content items available, one at a time, in the sequence indicated by the parent. When one content item is done, the next is enabled, and so on until all of the content items are played or completed.

Depending on the implementation, icons corresponding to all specified content items of the content sequence might be displayed simultaneously on child device 128, although only one of them might be available or enabled at any given time.

Alternatively, certain implementations might show only an icon corresponding to the currently active content item of the content sequence. Furthermore, the content items specified by the parent might be the only content available to the child, or the specified content items might be available in addition to other content that has been independently made available on child device 128.

Figure 2:
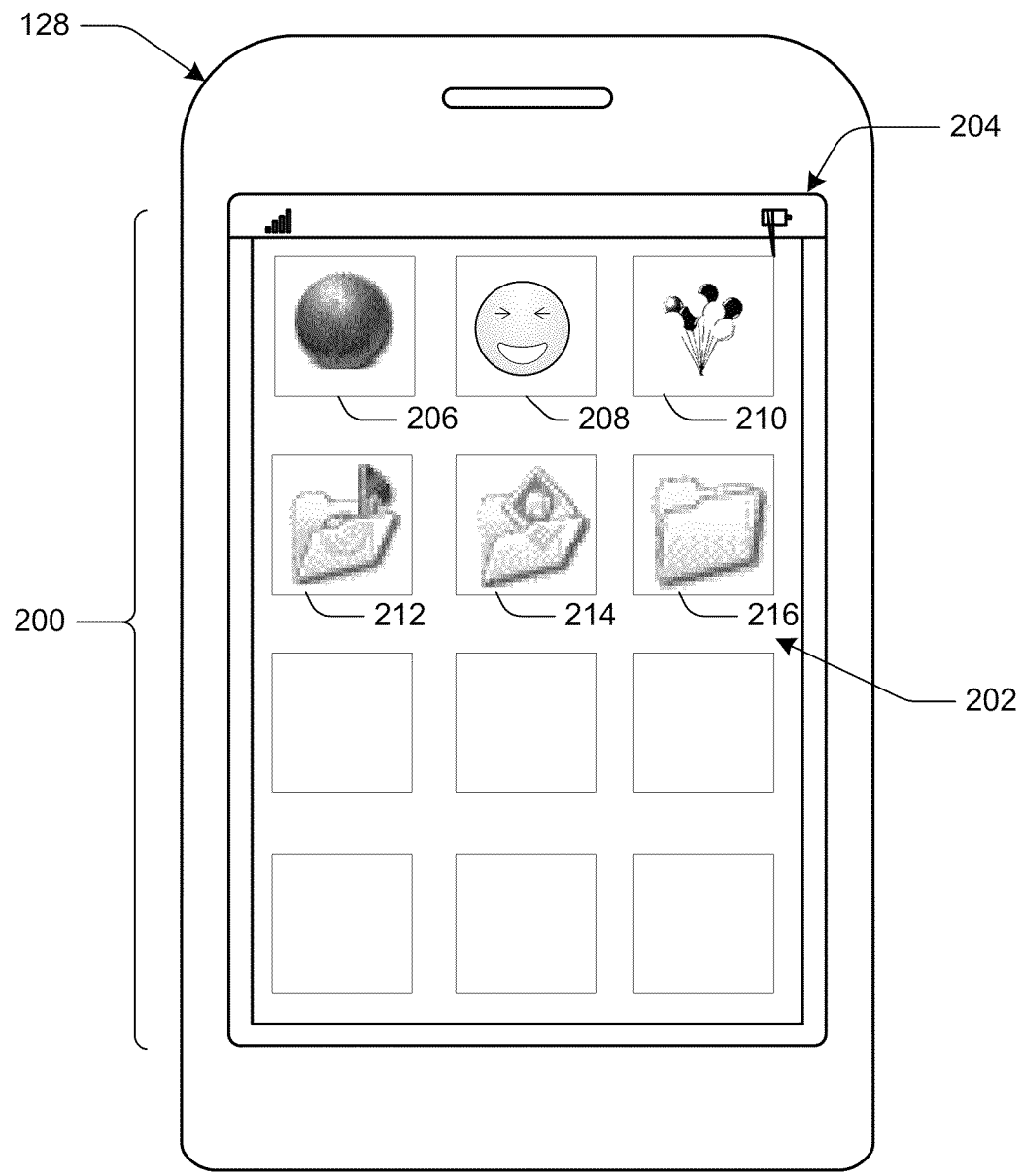
FIG. 2 shows an example of a simplified graphical interactive user interface for a child device.

FIG. 2 shows an example of a simplified graphical interactive user interface 200 for child device 128, configured to offer a variety of content and activities to the user of child device 128. User interface 200 in this embodiment comprises one or more graphical menus 202, on a touchscreen display 204, that provide access by the user of child device 128 to different content and activities that the user might play or engage in through child device 128, such as executing applications, initiating voice calls, and playing content. Each graphic menu 202 has a plurality of graphical icons, such as icons 206, 208, and 210, for example, corresponding to different content and activities available to the user of child device 128. In touchscreen implementations, touching one of the visible or enabled icons initiates the activity or content item associated with the icon.

In this example, icons 206, 208, and 210 might correspond to various pre-configured or default activities available on child device 128. In addition, user interface 200 might include one or more content sequence icons, in this example designated by reference numerals 212, 214, and 216, corresponding to content items specified by a parent via parent device 126 as part of a content sequence. For example, icon 212 might correspond to a first content item of a sequence, icon 214 might correspond to a second content item of the sequence, and icon 216 might correspond to a third content item of the sequence.

The activities and content items presented by user interface 200 and available to the user of child device 128 are thus configurable and customizable. However, such configuration and customization does not necessarily take place at child device 128. Rather, parent device 126 may be configured to remotely configure and customize specific activities and content available at child device 128. Moreover, the user of parent device 126 may have alternate interfaces available to configure and customize child device 128, such as a Web interface accessible via any device that accesses the Internet. Specifically, child device 128 configuration information is specified by the user of parent device 126 and then communicated to child device 128. The configuration information can indicate the activities and content items that are to be made available on the graphical user interface 200 and menu 202 of child device 128. More specifically, the configuration information can specify sequences of content items that are to be available on child device. Child device 128 receives the configuration information and applies it automatically. This allows the user of parent device 126 to both limit the activities and content available to the user of child device 128 and to introduce the user to new content and activities. The user of parent device 126 can change the configuration information at any time, upon which it is re-communicated to child device 128 and implemented there to change the content and activities indicated by graphical menu 202.

As mentioned, content items and activities can be specified in content sequences, indicating sequences of individual content items that are to be made available on child device 128 one after the other. The configuration information in this case might indicate when the sequence is to begin or to be made available on one or more of child devices 128. On child devices 128, the individual content items are enabled one at a time, in sequence. More specifically, any particular content item of a content sequence is enabled only when any preceding content item of the sequence has been played, when the user of child device 128 is done with any preceding content item of the content sequence.

Icons 212, 214, and 216 represent content items that have been specified as part of a content sequence. Although all three of icons 212, 214, and 216 are shown as being displayed simultaneously on interface 200 for purposes of illustration, these icons represent content items that are to be enabled in sequence, one at a time, as each preceding content item is finished. Thus, only icon 212 might initially be enabled, while icons 214 and 216 are disabled. When an icon is disabled, it might be grayed or partially transparent, and may not respond to user selection. In other embodiments, an icon corresponding to a disabled content item might be completely hidden or invisible, or completely absent from user interface 200.

After the user of child device 128 has played or completed the content item represented by icon 212, that icon and corresponding content item are disabled, and/or removed, and the icon corresponding to the next item of the content sequence—icon 214—is shown and enabled. After the user of child device 128 has played or completed the content item represented by icon 214, that icon and its corresponding content item are disabled and/or hidden, and the icon corresponding to the next item of the content sequence—icon 216—is shown and enabled.

In scenarios where a specified content item indicates one or more resources to be downloaded, downloading such resources can be deferred until the content item is enabled, and performed only in conjunction with enabling the content item. Alternatively, the downloading can further be deferred until the content item is actually selected or initiated by the user of child device 128. However, in some scenarios, it may be desirable to download the resources at the time of initially receiving configuration information, even if the content item is not yet enabled.

Figure 3:
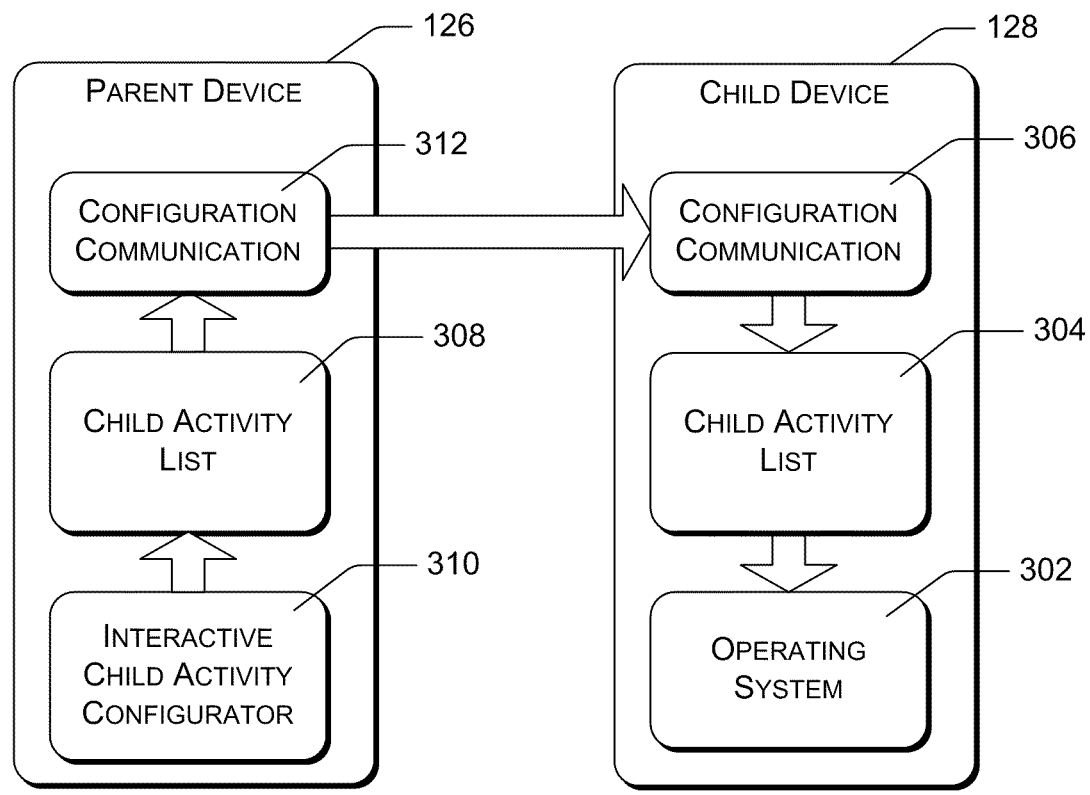
FIG. 3 is a block diagram illustrating how a child device can be configured from a parent device.

FIG. 3 shows one way this type of remote configuration might be configured between parent device 126 and child device 128. In this embodiment, an operating system 302 of child device 128 references a child activity list 304 when generating interactive user interface 200. Activity list 304 contains a list of activities and/or content items that are to be presented on user interface 200 of child device 128. Activity list 304 can also contain or specify content item sequences, comprising content items that are to be made available on child device 128 one at a time, in a specified sequence or order. Content items can be specified by Uniform Resource Locator (URL) or by some other protocol or format. Alternatively, content sequences can be specified indirectly, by specifying a URL that itself defines a content sequence.

Child device 128 also has a configuration communication component 306 that receives remote configuration information. The remote configuration information designates content sequences as mentioned above, specifying content items that are to be made available one at a time on child device 128.

Configuration communication component 306 is an executable component that may be part of operating system 302 or that may run in conjunction with operating system 302. Communication component 306 is configured to communicate with the device that has been designated as the parent device of child device 128—in this case parent device 126—and to receive remotely generated instructions or configuration information to add or remove activities from child activity list 304.

Parent device 126 has a corresponding child activity list 308 that is maintained by parent device 126 to designate activities, content items, and content sequences to be made available at child device 128. In addition, parent device 126 has an interactive child device configurator 310 that allows a user of parent device 126 to specify activities, content items, and content sequences for inclusion in the child activity list 304 of child device 128.

Interactive child device configurator 310 in this example is an executable program that runs on parent device 126. Using the user input/output capabilities of parent device 126, child device configurator 310 interacts with the user of parent device 126, allowing the user to specify different content items and content sequences.

Parent device 126 also has a configuration communication component 312 that is configured to communicate with child communication component 306 of child device 128. Changes to child activity list 308 on parent device 126 are automatically communicated through communication components 306 and 312 from parent device 126 to child device 128, and child activity list 304 on child device 128 is updated to mirror the content of child activity list 308 of parent device 126. In turn, operating system 302 of child device 128 responds to changes in its child activity list 304 by updating its graphical user interface 200 to show the activities and content items that are currently to be made available.

In many cases, the user of parent device 126 can designate desired content items by their Internet URLs (uniform resource allocators) or addresses. Alternatively, a service plan carrier might provide a menu of different content items or content sequences available from the service plan carrier itself.

Although the configurator is described above as a discrete executable program, its functionality could alternatively be integrated with the operating system of the parent device 126 or even accessed from a server as an Internet application.

Figure 4:
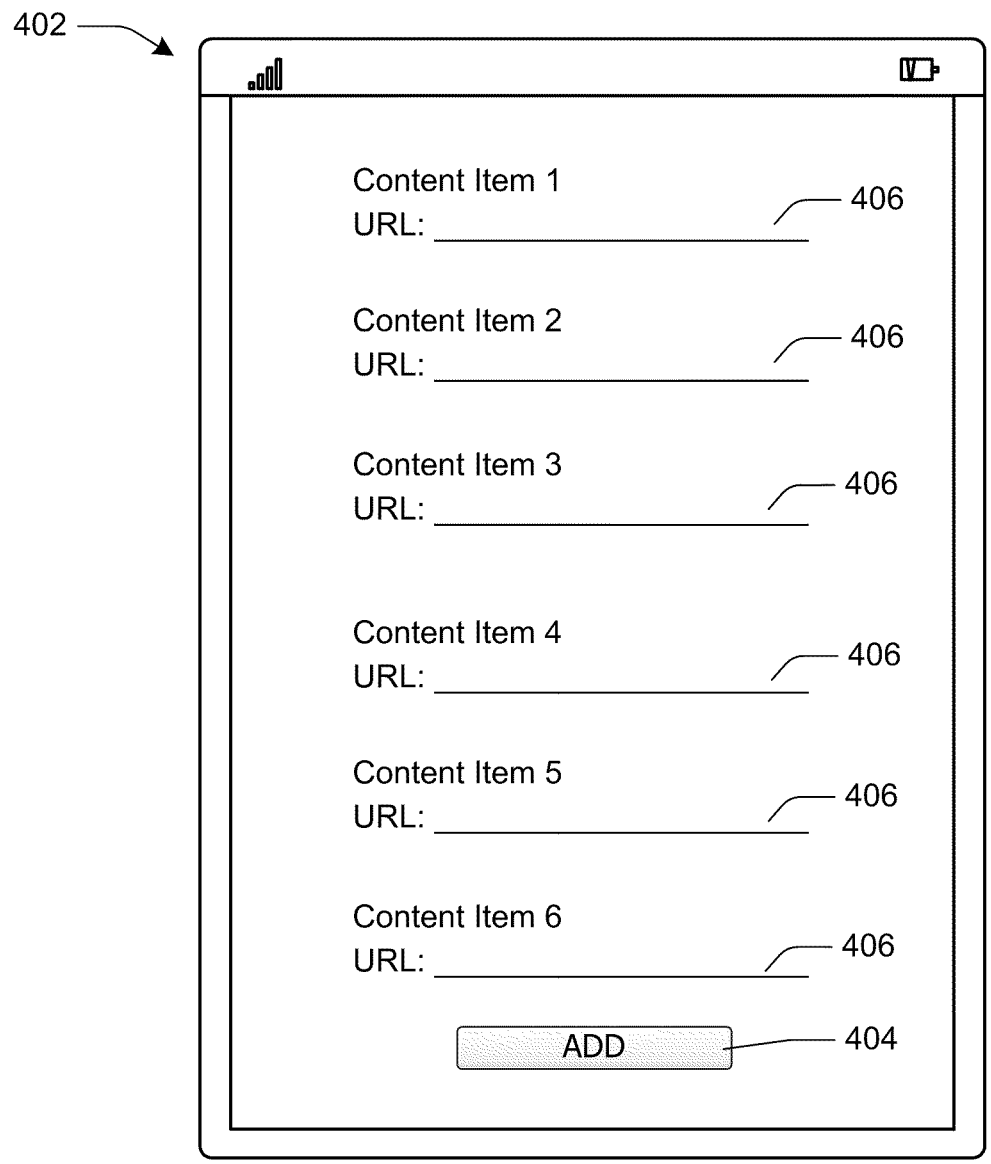
FIG. 4 is an illustration of a parent device configurator user interface.

FIG. 4 shows a simple example of how a user interface 402 of interactive child activity configurator 310 might be implemented on parent device 126. In this example, interactive child activity configurator 310 is designed to allow a parent to enter multiple URLs corresponding to content items, in a sequence or order that the corresponding content items are to be offered on child device 128. Selecting or pressing the "Add" button 404 at the bottom of the screen adds the resulting content sequence to the child activity list.

In this example, there is a listing of labeled, blank URL fields 406 arranged vertically, in order from top to bottom. The parent can enter an Internet URL into each of these blanks. The URL under the title "Content Item 1" corresponds to a first content item in the sequence; the URL under the title "Content Item 2" corresponds to a second content item; and so on.

Interactive child activity configurator 310 and its user interface might be configured in many different ways to allow more detailed descriptions of content items and for more convenient selection of sequences. For example, content items might be selected from one or more preconfigured menus, so that the parent does not need to manually enter URLs. Alternatively, entire precompiled sequences themselves might be available from preconfigured menus.

It may also be desirable in certain embodiments for the user of parent device 126 to specify additional descriptive or limiting information for different content items. As one example, the parent may specify completion criteria, indicating how device 128 will conclude that a particular content item has been completed or finished. The parent might specify that the child has to play the entirety of the content item for it to be considered completed. Alternatively, the parent might specify only that the child initiate each content item, whether or not the content item is played to its completion. As yet another alternative, a content item might be considered finished or completed simply by the passage of time, so that once an activity has been enabled for a specified time period, it is considered finished and the next content item is enabled.

In other cases, completion criteria might be specified within the content items themselves, or inferred based on type of content.

Figure 5:
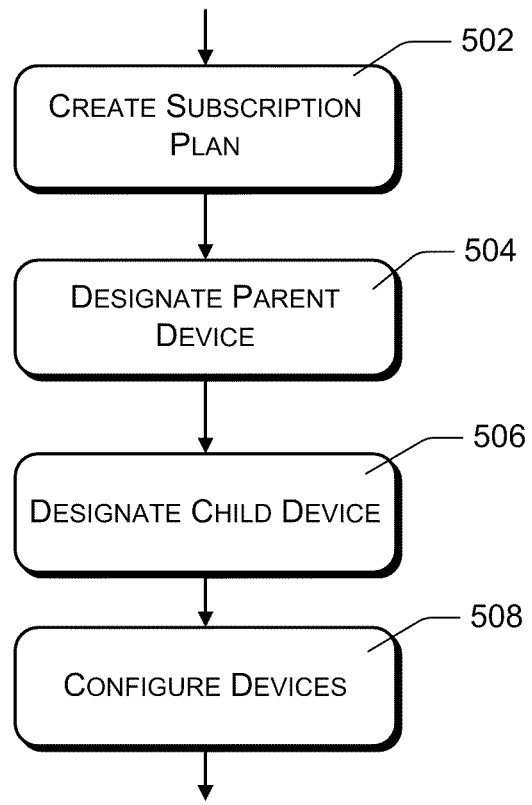
FIG. 5 shows an example of actions performed by a carrier to implement the functionality described herein.

FIG. 5 shows an example of actions performed by a carrier to implement the functionality described above. An action 502 comprises creating a subscription plan or feature and associating a set of two or more telecommunication devices with that common subscription plan or feature. An action 504 comprises designating parent device 126 from among the set of telecommunication devices. An action 506 comprises designating child device 128 from among the set of telecommunications devices.

A further action 508 comprises configuring parent device 126 and child device 128 to function as described above. Specifically, child device 128 is configured to receive configuration information or settings from parent device 126 indicating activities, content items, and content sequences for use on child device 128. Child device 128 is also configured to disable or hide certain content items in accordance with any limitations or sequences indicated by the configuration information.

In some embodiments, at least two devices are designated as child devices 128 at action 506. Each child device 128 can be configured at action 508 to receive different configuration information created by the user of parent device 126. Alternatively, two or more child device 128 can be configured at action 508 to receive common configuration information, and to control the activities on all child devices in accordance with the common configuration information. This latter configuration is convenient in managing multiple child devices, but also allows a parent to create common expectations and excitement among children.

Content items and resources such as music, pictures, etc., can be downloaded as needed, along with any applications necessary to render the content items. Content and applications can be downloaded ahead of time, upon receiving the configuration information. Alternatively, downloading can be delayed until the associated activity is selected, or until the time period during which the activity is to be available.

Child device 128 displays activities relating to these resources on a graphical menu or user interface during the times they are specified as being available, and disables and/or hides them at other times.

Figure 6:
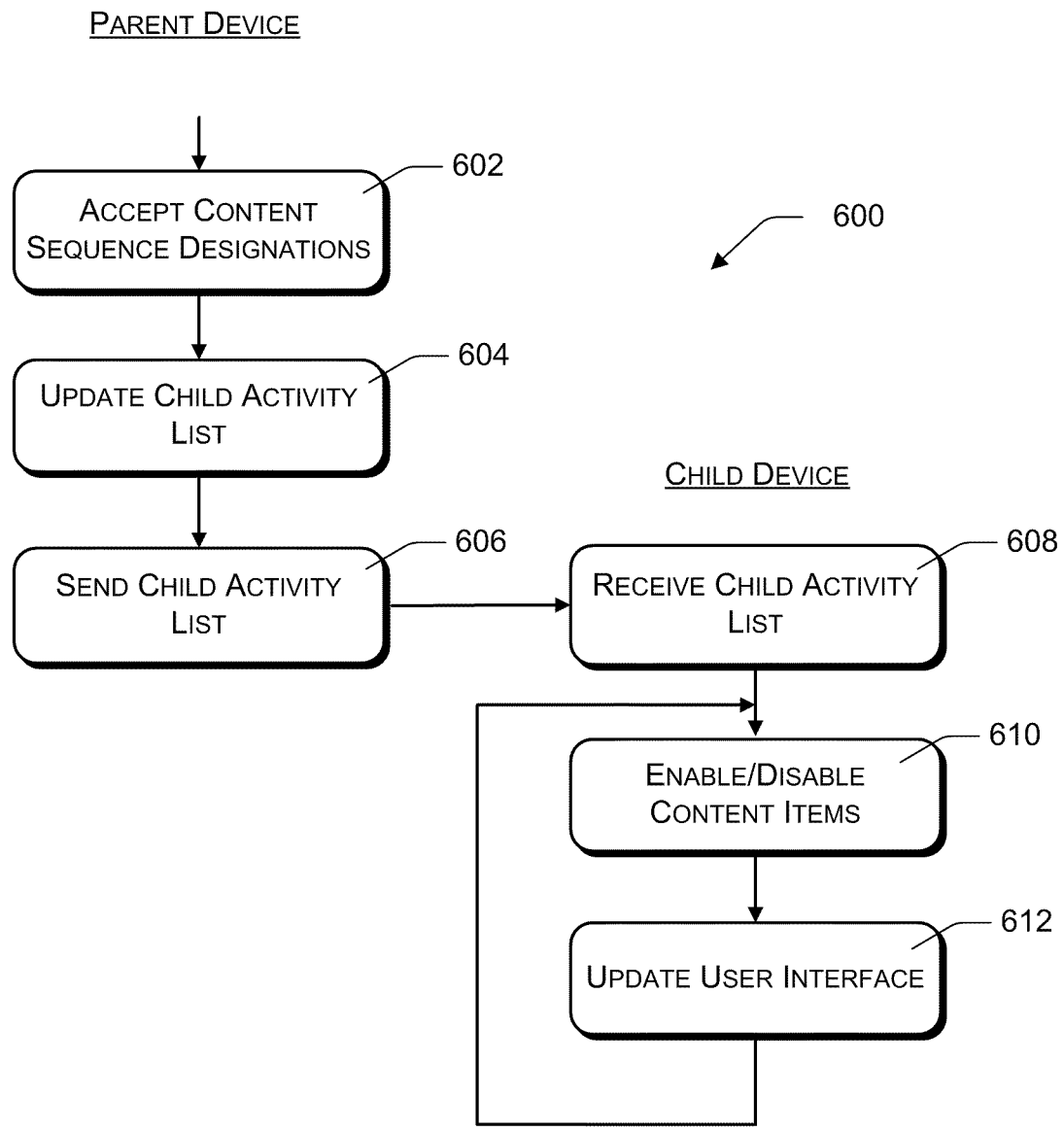
FIG. 6 is a flowchart illustrating a method of configuring a child device from a parent device.

FIG. 6 is a flowchart illustrating a method of configuring child device 126 from parent device 128. Actions performed by parent device 126 are shown on the left. Actions performed by child device 128 are shown on the right.

An action 602 comprises accepting content item and sequence designations from the user of parent device 126. An action 604 comprises updating child activity list 308 on parent device 126, in accordance with the designations made in action 602. An action 606 comprises sending child activity list 308 to the device that has been designated as child device 128. In some embodiments, parent device 126 can maintain different child activity lists 308 corresponding to different child devices 128. Such different child activity lists may or may not specify common activities and time periods for the different child devices 128. In other embodiments, parent device 126 might maintain a single child activity list 308 for distribution to multiple child devices 128, resulting in the same schedule of activities being available to the users of each child device 128.

In an action 608, child device 128 receives child activity list 308, which indicates remote configuration information or settings, including specifications of content sequences.

Sending and receiving child activity list 304/308 can be accomplished in various ways using a variety of protocols. Various "push" protocols exist that allow one device to notify another of a request for information transfer. Alternatively, child device 128 might be configured to poll for new information at periodic intervals.

Also note that an intermediary such as a server might be used to facilitate transfer of child activity list 304/308 from parent device 126 to child device 128. Thus, parent device 126 might transmit the child activity list 308 to the server for storage. Child device 128 would then download the information from the intermediary server rather than directly from parent device 126. This type of arrangement would allow child activity list 304 to also be configured from devices other than parent device 126, such as from a computer connected to the Internet.

An action 610, performed by child device 128, comprises showing and/or enabling any individual activities indicated by the received child activity list 304 to be allowable at the current time, and hiding and/or disabling any individual activities not indicated by the received child activity list 304 to be allowable at the current time. This may be accomplished by specifically hiding and/or disabling individual items of a content sequence except during times they are the current item of the content sequence.

Action 610 also potentially includes making any downloads and installations that might be prerequisites to any newly specified content items. When child activity list 304/308 indicates a content sequence, resources associated with the sequence can be downloaded ahead of time, when child device 128 receives the configuration information. Alternatively, the resources for a particular content item can be retrieved only when or after the preceding content item of the sequence is finished. In some cases, resources might be obtained or downloaded only when the content item is enabled, or they might be streamed on demand. In still other cases, resources for a particular content item might be retrieved while the previous content item of the sequence is being played.

An action 612, performed by operating system 302 of child device 108, comprises updating child device's user interface 200 to reflect any changes in child activity list 304. Specifically, graphical menu 202 described in FIG. 2 is updated to display icons corresponding to the content and activities specified in child activity list 304 as currently being enabled. Actions 610 and 612 are repeated, to continuously update the child device's user interface. Thus, different content might be available at different times. During a sequence, specified content items are sequentially activated, enabled, or initiated.

Figure 7:
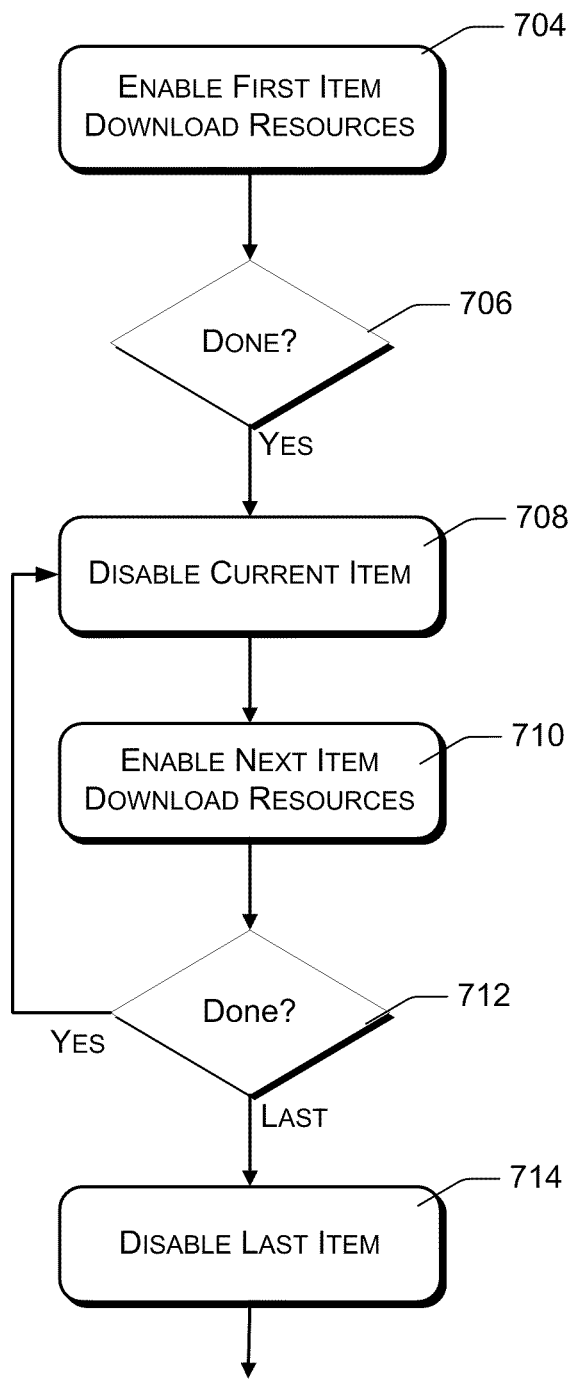
FIG. 7 shows how child device might implement content items that are specified by configuration information as part of a content sequence.

FIG. 7 illustrates shows how child device 128 might respond to receiving configuration information that specifies a content sequence. A content sequence comprises one or more individual content items, and indicates an order in which those content items are to be shown or enabled on child device 128.

An action 704 comprises enabling and/or showing the first content item of the sequence on the user interface of child device 128. This may also include downloading any resources that form part of the designated content item.

An action 706 comprises determining whether or when the first content item is done. A content item can be considered "completed" or "done" using different criteria, depending on the circumstances or objectives. For example, the user of child device 128 might voluntarily end the activity or indicate that they are done. Alternatively, a content item might be considered done when the user of child device 128 has reached the end of the content item, has reached a certain temporal point within the content item, or has played or engaged the content item for a specified time. As yet further alternatives, a content item might be considered done or completed when a user has initiated and then stopped the content item; upon completion or partial completion of certain interactions, activities, or assignments presented by the content item; upon obtaining a passing or acceptable grade or success rate with respect to interactions or questions posed by the content item. More generally, different completion criteria can be defined for various content items, and those items will be considered completed or done when the completion criteria have been satisfied.

When the first content item is done, an action 708 comprises disabling, terminating, and/or hiding the first content item. Note that action 708 may not be included in all implementations. In some implementations, completed content items may continue to be enabled and accessible, even as subsequent content items become enabled.

An action 710 comprises enabling, initiating, or showing the next content item in the specified content sequence, and may also include downloading any resources corresponding to the designated content item. An action 712 comprises determining whether the currently enabled content item is done, as already described with reference to action 706. When the currently enabled content item is done, actions 708 and 710 are repeated, disabling the current content item and enabling the next content item. Alternatively, if there are no more content items specified in the content sequence, an action 714 comprises disabling the last content item. Again action 714 may be omitted in some implementations, and completed content items may continue to be enabled and accessible, even as subsequent content items become enabled.

Figure 8:
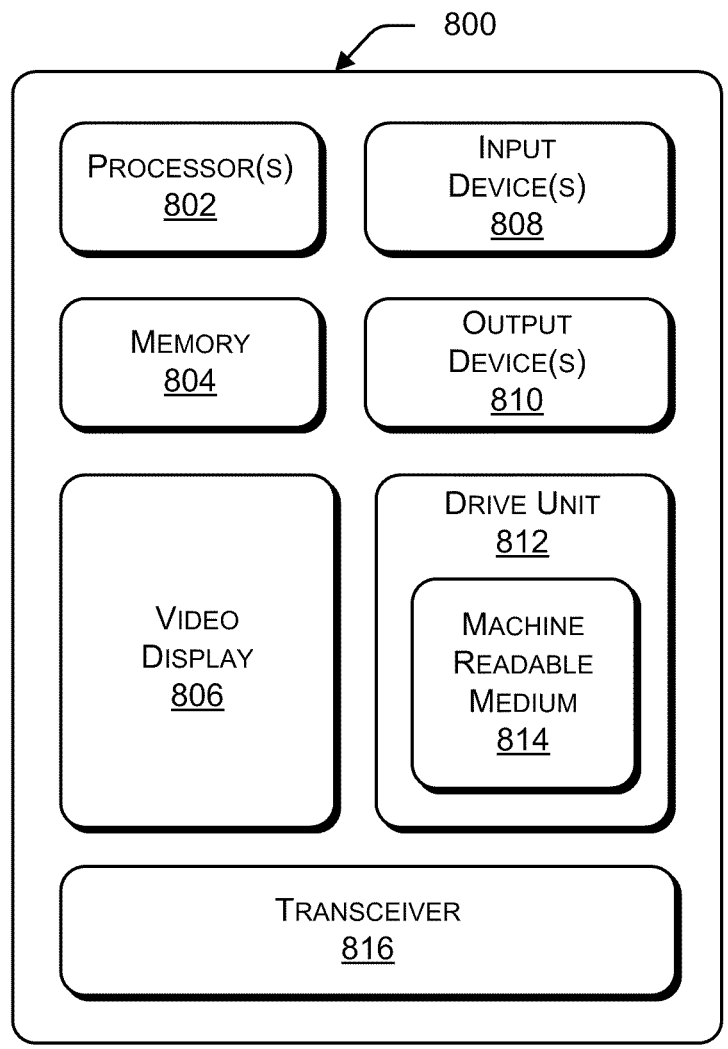
FIG. 8 is a block diagram showing common components of a telecommunications device such as might be used to implement the parent and child devices described herein.

FIG. 8 shows an exemplary telecommunication device 800 such as may be used as either parent device 126 or child device 128. Telecommunication device 800 comprises one or more processors 802, a memory 804, a video display 806, one or more input devices 808, one or more output devices 810, a drive unit 812 that can access a machine readable medium 814, and a transceiver 816. Machine readable medium 714 stores one or more sets of instructions (e.g., software) embodying any one or more of the methodologies or functions described herein. The instructions may also reside, completely or at least partially, within memory 804 and within processor 802 during execution thereof by the telecommunication device 800. Memory 804 and processor 802 also may constitute machine-readable media.

In child device 128, for example, the machine-readable memory might include an operating system or other program configured to receive configuration information and to respond by displaying indicated activities on video display 806. In some cases, a program for achieving the functionality described above might be loaded onto telecommunication device 800 by a reseller of the device, such as by a service carrier that bundles the device with a service plan. In other cases, the manufacturer of the device might include the functionality as a native element of the device. Alternatively, the functionality might be part of a program that is installed by an end-user.

In parent device 126, the machine-readable memory might include an operating system or other program configured to interact with a user of parent device 126 to establish the configuration information and to send those setting for eventual receipt by the child device. Again, this functionality might be included with the native software as the device is manufactured, or added latter by a reseller or an end-user.

Input device 808 may be a keyboard, keypad, touch screen, or microtelecommunications device. Other input devices 808 may be used. Video display 806 may be a liquid crystal display (LCD), a flat panel, a solid state display or other device. Processor 802 may be a central processing unit (CPU), a graphics processing unit (GPU), or both CPU and GPU, or other processing unit or component.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A child telecommunications device, comprising:
   an interactive user interface that offers content items to a user of the child telecommunications device;
   the child telecommunications device being configured to perform actions comprising:
      receiving remote configuration information that indicates a sequence of individual content items to be made available on the interactive user interface;
      enabling the individual content items one at a time on the interactive user interface in the sequence indicated by the remote configuration information;
      receiving input through the interactive user interface;
      based on the input, performing one or more actions meeting completion criteria associated with one of the individual content items;
      responsive to the performing, disabling any preceding content item of the sequence; and
      responsive to the disabling, enabling a next content item in the sequence of individual content items.

2. A child telecommunications device as recited in claim 1, wherein enabling any particular content item of the sequence is performed only after any preceding content item of the sequence has been played.

3. A child telecommunications device as recited in claim 1, the actions further comprising downloading any particular content item only in conjunction with enabling that particular content item.

4. A child telecommunications device as recited in claim 1, wherein enabling any particular content item of the sequence is performed only after any preceding content item of the sequence has been completed.

5. A child telecommunications device as recited in claim 1, wherein:
   the content items have associated completion criteria; and
   enabling any particular content item of the sequence is performed only after any preceding content item of the sequence has been completed in accordance with the completion criteria associated with the preceding content item.

6. A child telecommunications device as recited in claim 1, wherein:
   the content items comprise interactive educational content items having associated completion criteria; and
   enabling any particular content item of the sequence is performed only after any preceding content item of the sequence has been completed in accordance with the completion criteria associated with the preceding content item.

7. A child telecommunications device as recited in claim 1, wherein enabling any particular content item of the sequence is performed only after any preceding content item of the sequence has been selected on the interactive user interface by a user of the child telecommunications device.

8. One or more non-transitory computer-readable media containing instructions that are executable on a telecommunications device to perform actions comprising:
   receiving remote configuration information that indicates a sequence of individual content items to be made available to a user of the telecommunications device;
   receiving input through an interactive user interface of the telecommunications device;
   based on the input, performing one or more actions meeting completion criteria associated with one of the individual content items;
   responsive to the performing, disabling any preceding content item of the sequence; and
   responsive to the disabling, enabling a next content item in the sequence of individual content items.

9. The one or more non-transitory computer-readable media of claim 8, the actions further comprising:
   showing individual content items on a graphical display of the telecommunications device when they are enabled; and
   hiding individual content items from the graphical display of the telecommunications device when they are disabled.

10. The one or more non-transitory computer readable media of claim 8, the actions further comprising downloading any particular content item only in conjunction with enabling that particular content item.

11. The one or more non-transitory computer-readable media of claim 8, wherein:
    the content items include completion criteria; and
    enabling any particular content item of the sequence is performed only after any preceding content item of the sequence has been completed in accordance with the completion criteria of the preceding content item.

12. The one or more non-transitory computer-readable media of claim 8, wherein:
    the content items comprise interactive educational content items having associated completion criteria; and
    enabling any particular content item of the sequence is performed only after any preceding content item of the sequence has been completed in accordance with the completion criteria associated with the preceding content item.

13. A method comprising:
    receiving, by a child telecommunications device, remote configuration information that indicates a sequence of individual content items to be made available on an interactive user interface of the child telecommunications device;
    enabling, by the child telecommunications device, the individual content items one at a time on the interactive user interface in the sequence indicated by the remote configuration information;
    receiving, by the child telecommunications device, input through the interactive user interface;
    based on the input, performing, by the child telecommunications device, one or more actions meeting completion criteria associated with one of the individual content items;
    responsive to the performing, disabling, by the child telecommunications device, any preceding content item of the sequence; and responsive to the disabling, enabling, by the child telecommunications device, a next content item in the sequence of individual content items.

14. The method of claim 13, wherein enabling any particular content item of the sequence is performed only after any preceding content item of the sequence has been played.

15. The method of claim 13, further comprising downloading any particular content item only in conjunction with enabling that particular content item.

16. The method of claim 13, wherein enabling any particular content item of the sequence is performed only after any preceding content item of the sequence has been completed.

17. The method of claim 13, wherein the content items have associated completion criteria and the method further comprises enabling any particular content item of the sequence only after any preceding content item of the sequence has been completed in accordance with the completion criteria associated with the preceding content item.

18. The method of claim 13, wherein the content items comprise interactive educational content items having associated completion criteria, and the method further comprises enabling any particular content item of the sequence only after any preceding content item of the sequence has been completed in accordance with the completion criteria associated with the preceding content item.

19. The method of claim 13, wherein enabling any particular content item of the sequence is performed only after any preceding content item of the sequence has been selected on the interactive user interface by a user of the child telecommunications device.

* * * * *